US012679319B2

(12) United States Patent  
Brinkley et al.

(10) Patent No.: US 12,679,319 B2  
(45) Date of Patent: Jul. 14, 2026

(54) VEHICLE WITH PARKING BRAKE SYSTEM

(71) Applicant: CNH Industrial America LLC, New Holland, PA (US)

(72) Inventors: Jerry L. Brinkley, Woodridge, IL (US); Ryan Jenkins, Bolingbrook, IL (US); Matthew Klopfenstein, Chenoa, IL (US); Giovanni Mendoza, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 660 days.

(21) Appl. No.: 18/081,544

(22) Filed: Dec. 14, 2022

(65) Prior Publication Data

US 2024/0198989 A1 Jun. 20, 2024

(51) Int. Cl.
| | |
|---|---|
| *B60T 13/22* | (2006.01) |
| *B60T 13/68* | (2006.01) |
| *B60T 17/22* | (2006.01) |
| *B62D 5/06* | (2006.01) |
| *B62D 5/07* | (2006.01) |
| *B62D 49/06* | (2006.01) |

(52) U.S. Cl.
CPC ............ *B60T 13/22* (2013.01); *B60T 13/686* (2013.01); *B60T 17/22* (2013.01); *B62D 5/063* (2013.01); *B62D 5/075* (2013.01); *B62D 49/06* (2013.01); *B60T 2260/02* (2013.01); *B60T 2270/88* (2013.01)

(58) Field of Classification Search
None
See application file for complete search history.

(56) References Cited

U.S. PATENT DOCUMENTS

| | | | |
|---|---|---|---|
| 10,479,336 B2 | 11/2019 | Abrahamsson | |
| 2013/0341116 A1* | 12/2013 | Strueh | B62D 5/065 |
| | | | 180/432 |

FOREIGN PATENT DOCUMENTS

| | | | | |
|---|---|---|---|---|
| CA | 2086870 | 7/1996 | | |
| CN | 107842531 A | * 3/2018 | | B60T 13/12 |
| EP | 2974929 | 10/2016 | | |

(Continued)

OTHER PUBLICATIONS

CN-107842531-A: English Machine Translation (Year: 2018).*

(Continued)

*Primary Examiner* — Melanie Torres Williams

(74) *Attorney, Agent, or Firm* — Foley & Lardner LLP

(57) ABSTRACT

A vehicle includes a chassis, a tractive element coupled to the chassis, and a parking brake system. The chassis includes at least one of a transmission or a structural frame. The parking brake system includes a parking brake configured to brake the tractive element when engaged. The parking brake is configured to be disengaged to permit rotation of the tractive element in response to the parking brake receiving a fluid. The parking brake system includes a fluid supply configured to supply the fluid to the parking brake to disengage the parking brake. The fluid supply is configured to stop supplying the fluid in response to a component of the vehicle ceasing operation. The parking brake system includes a pump coupled to the chassis and configured to supply the fluid to the parking brake at least when the component of the vehicle is not operating.

17 Claims, 10 Drawing Sheets

(56) References Cited

FOREIGN PATENT DOCUMENTS

| JP | 2001316096 | A | * | 11/2001 | ............. | B62D 5/065 |
| JP | 2004196110 | A | * | 7/2004 | ............. | B62D 11/24 |

OTHER PUBLICATIONS

JP-2001316096-A: English Machine Translation (Year: 2001).*
JP-2004196110-A: English Machine Translation (Year: 2004).*
European Search Report and Written Opinion dated May 10, 2024
for related European Application No. 23216917.7 (10 pages).

* cited by examiner

1

VEHICLE WITH PARKING BRAKE SYSTEM

BACKGROUND

The present disclosure relates generally to vehicles. More specifically, the present disclosure relates to a braking system for a vehicle.

Vehicles include braking systems that apply braking forces to slow or stop the vehicle. Some braking systems include a parking brake. When applied, the parking brake slows the vehicle to a stop and holds the vehicle stationary. Some parking brakes activate automatically in response to certain conditions. To tow the vehicle, the parking brake must be deactivated to allow the vehicle to be pulled freely.

SUMMARY

One embodiment relates to a vehicle. The vehicle includes a chassis, a tractive element coupled to the chassis, and a parking brake system. The chassis includes at least one of a transmission or a structural frame. The parking brake system includes a parking brake configured to brake the tractive element when engaged. The parking brake is configured to be disengaged to permit rotation of the tractive element in response to the parking brake receiving a fluid. The parking brake system includes a fluid supply configured to supply the fluid to the parking brake to disengage the parking brake. The fluid supply is configured to stop supplying the fluid in response to a component of the vehicle ceasing operation. The parking brake system includes a pump coupled to the chassis and configured to supply the fluid to the parking brake at least when the component of the vehicle is not operating.

Another embodiment relates to a vehicle. The vehicle includes a chassis, a tractive element coupled to the chassis, a steering actuator coupled to the tractive element, a parking brake configured to brake the tractive element when engaged, a steering pump fluidly coupled to the steering actuator and the parking brake and configured to (a) supply a first volume of a fluid to the steering actuator to steer the tractive element and (b) supply a second volume of the fluid to the parking brake to disengage the parking brake, and a steering wheel coupled to the steering pump. The steering wheel is configured to drive the steering pump when rotated.

Still another embodiment relates to a vehicle. The vehicle includes a chassis, a cab coupled to the chassis, a tractive element coupled to the chassis, a parking brake configured to brake the tractive element when engaged, a pump fixedly coupled to the chassis and configured to supply a fluid to the parking brake to disengage the parking brake, and an input shaft coupled to the pump and configured to drive the pump. The input shaft is positioned such that the input shaft is accessible from at least one of (a) an exterior of the vehicle or (b) within the cab.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

2

Figure 1:
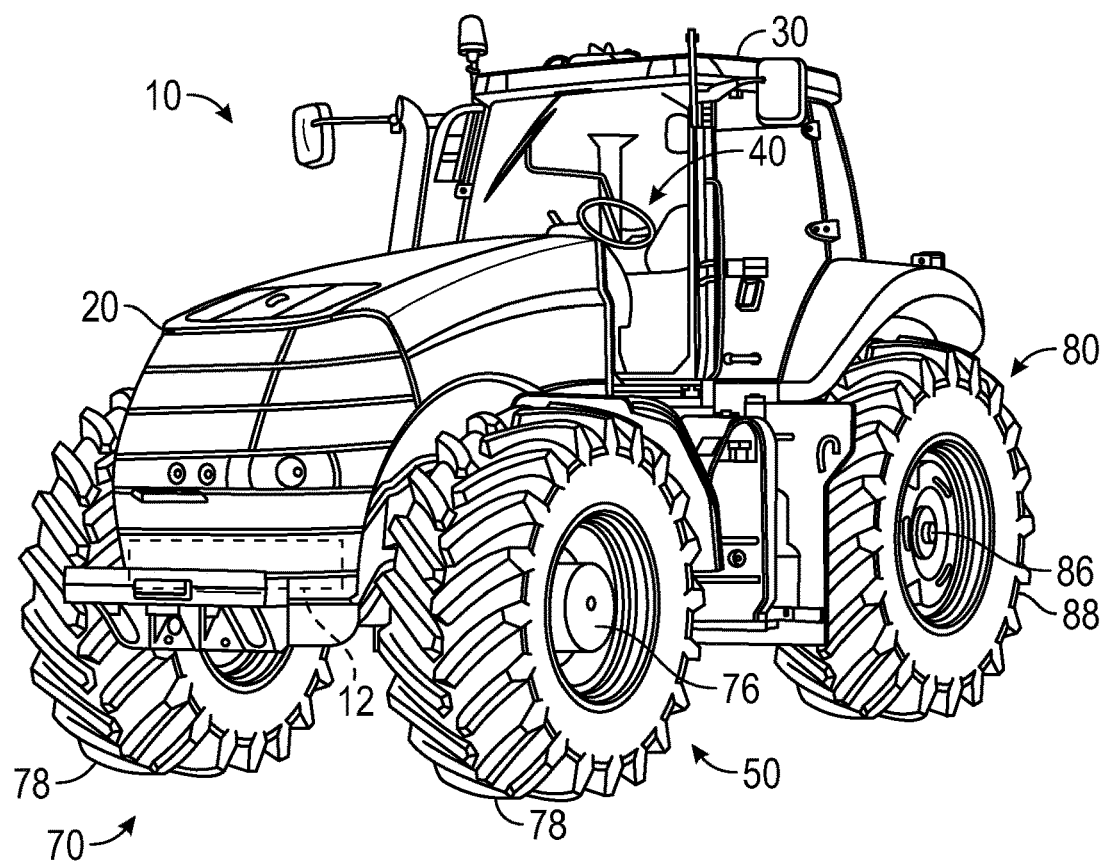
FIG. 1 is a perspective view of a vehicle, according to an exemplary embodiment.
Figure 3:
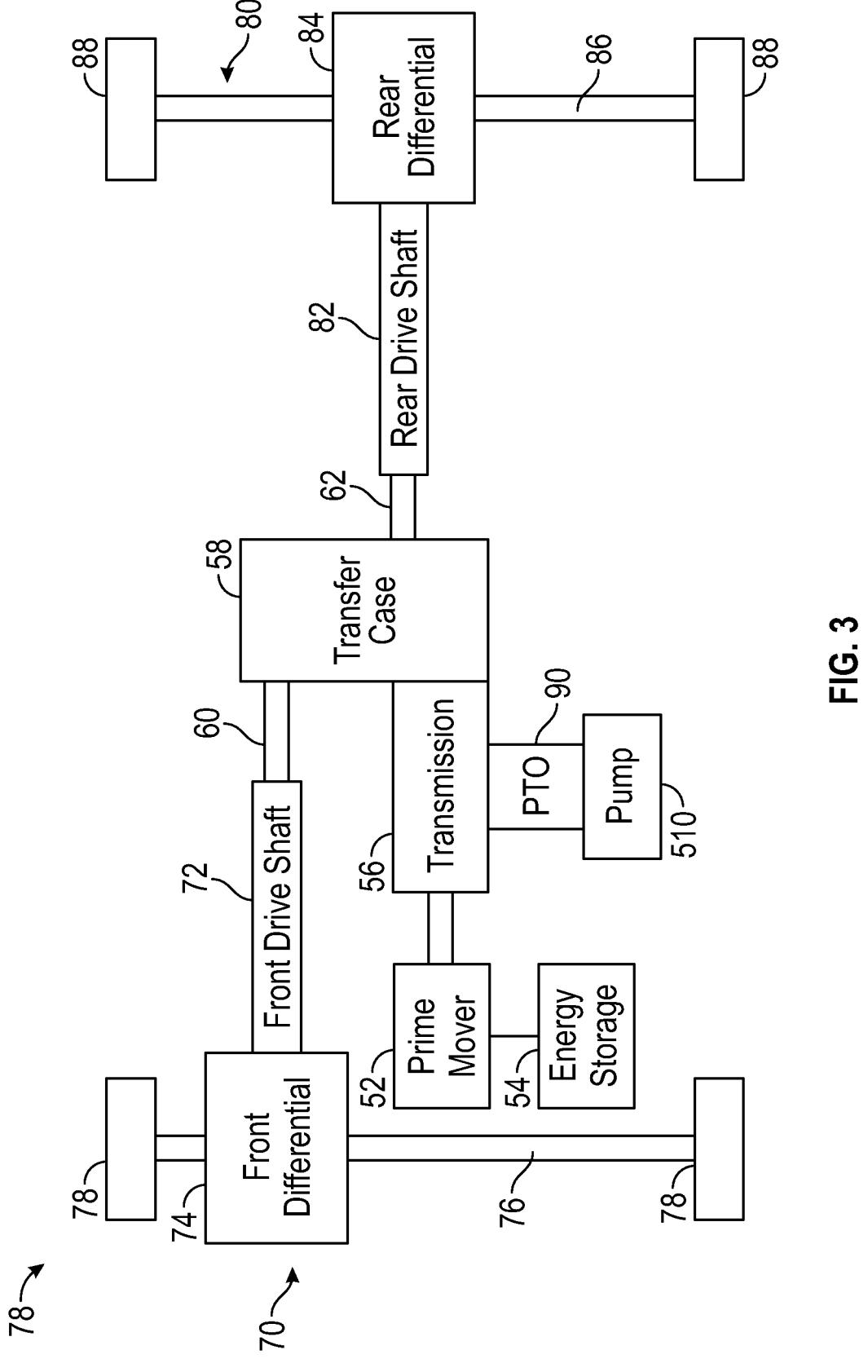

FIG. 3 is a schematic block diagram of a driveline of the vehicle of FIG. 1, according to an exemplary embodiment.

Figure 4:
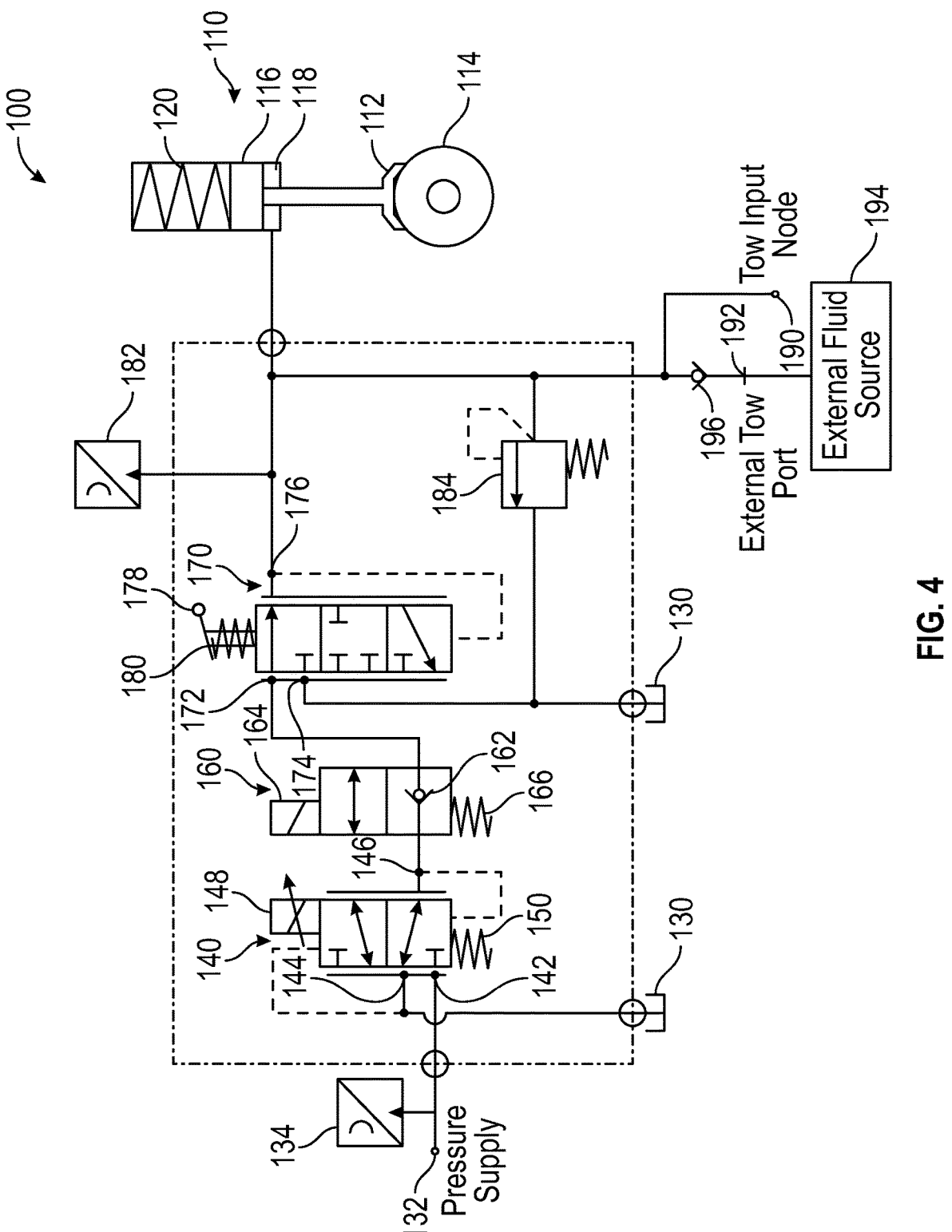

FIG. 4 is a schematic of a parking brake system of the vehicle of FIG. 1, according to an exemplary embodiment.

Figure 5:
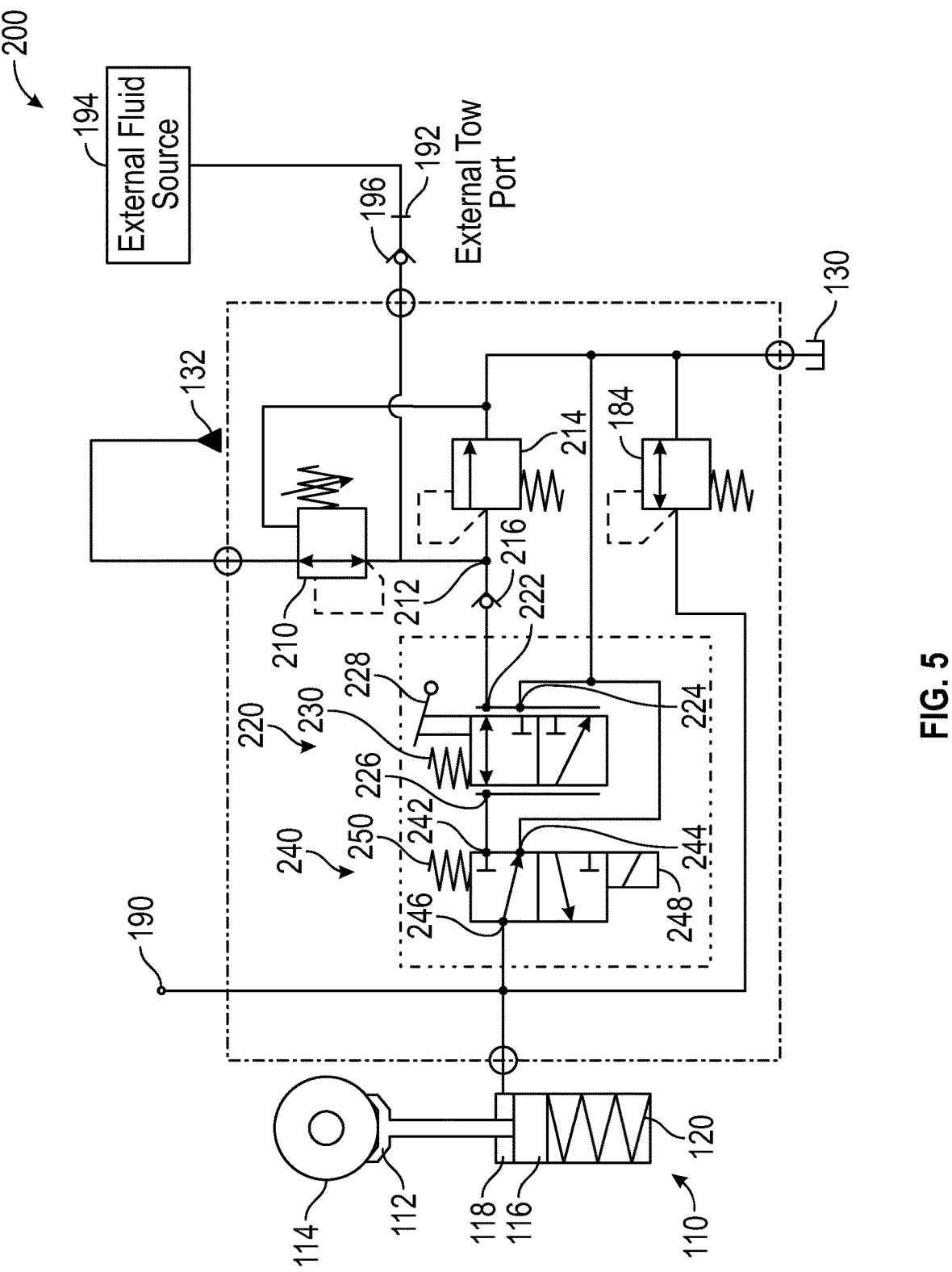

FIG. 5 is a schematic of a parking brake system of the vehicle of FIG. 1, according to another exemplary embodiment.

Figure 6:
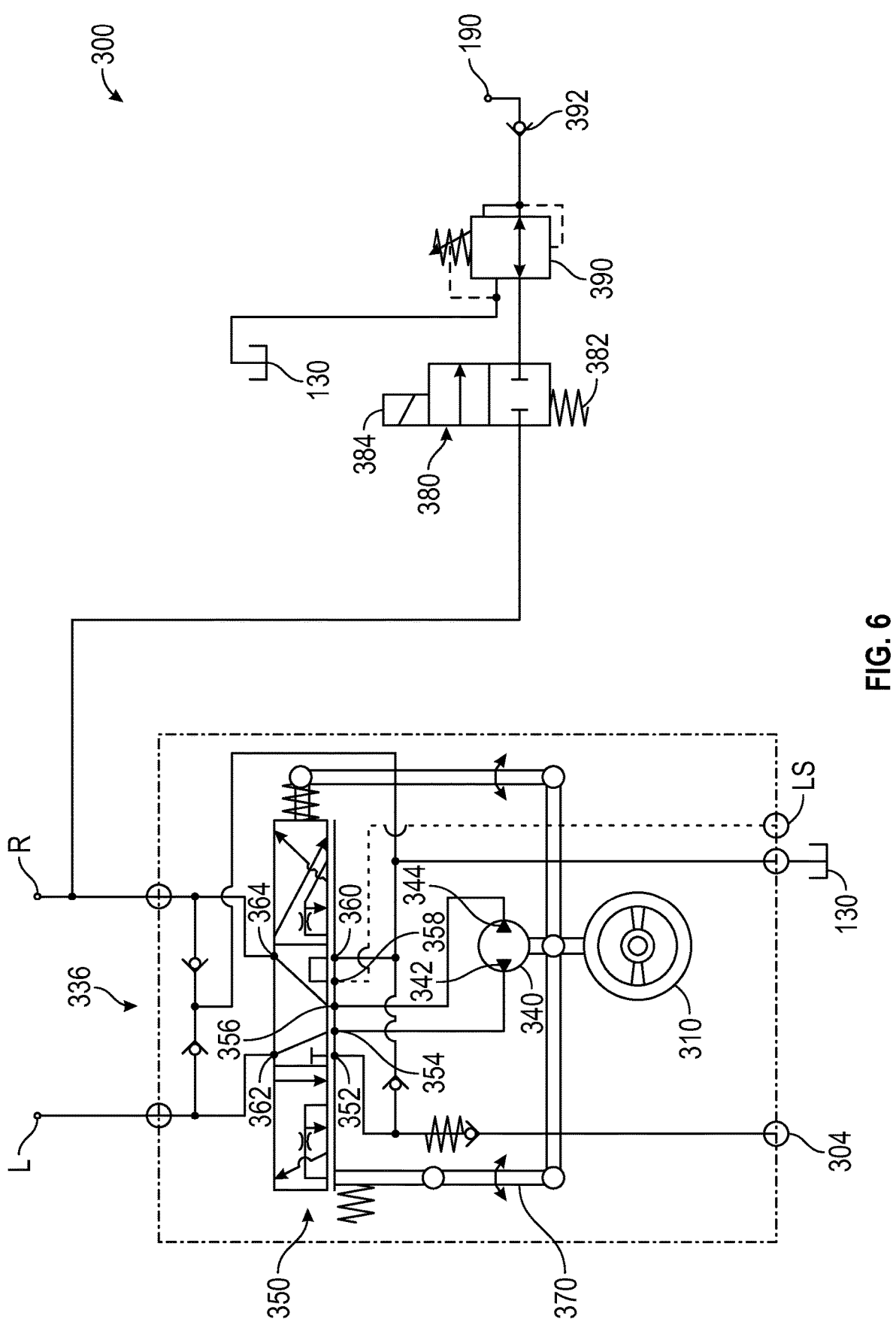
Figure 7:
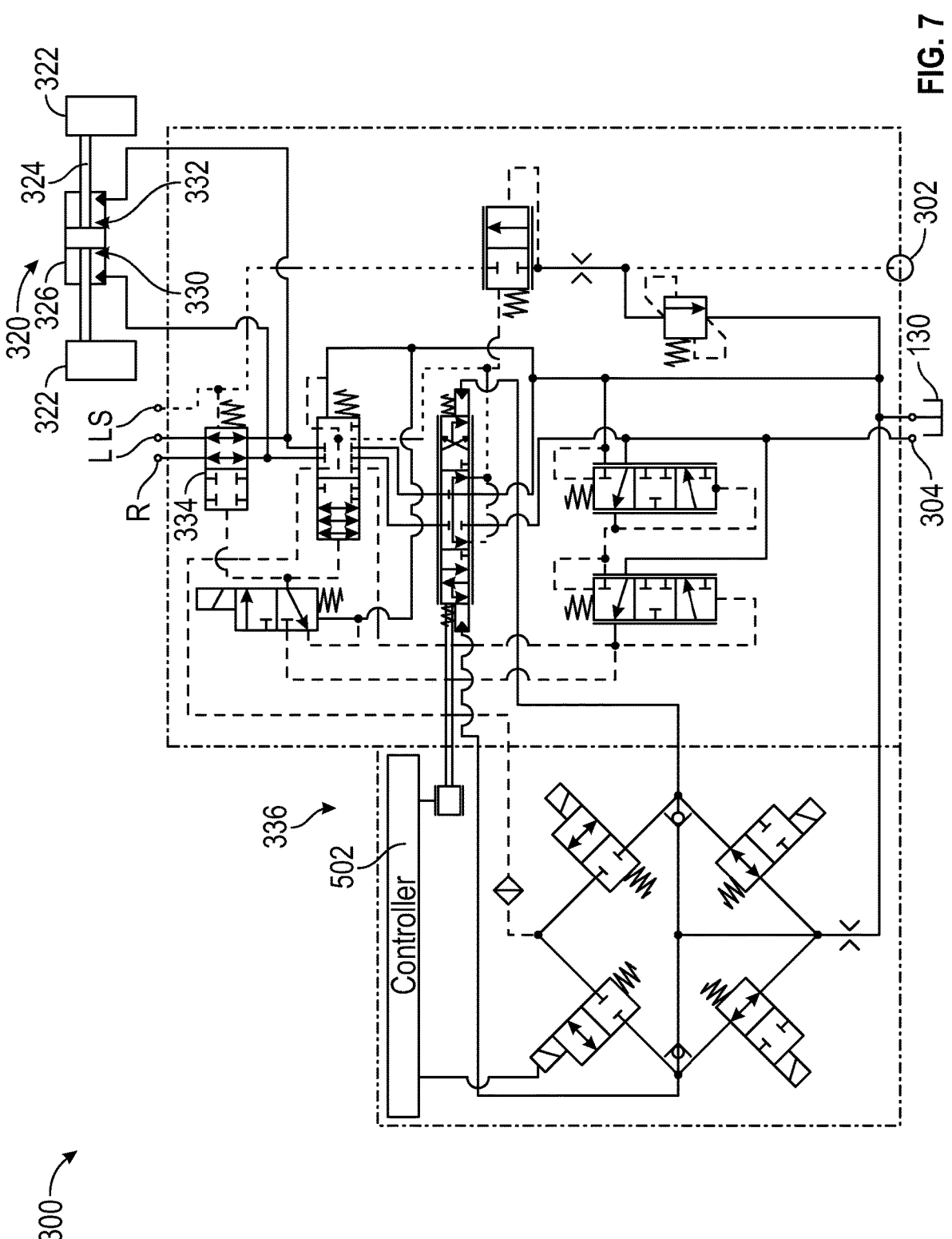

FIGS. 6 and 7 are schematics of a steering system of the vehicle of FIG. 1, according to an exemplary embodiment.

Figure 8:
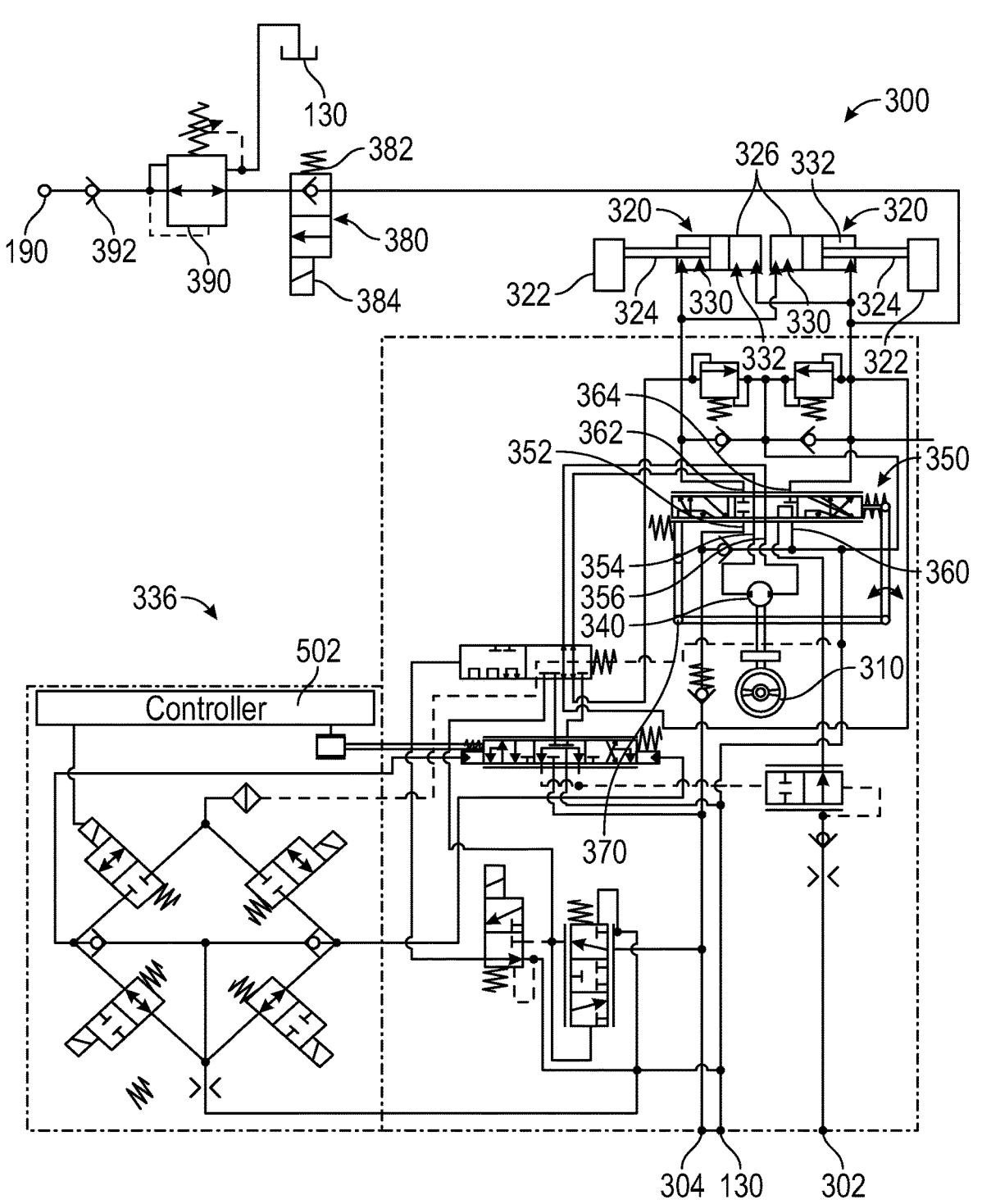

FIG. 8 is a schematic of a steering system of the vehicle of FIG. 1, according to another exemplary embodiment.

Figure 9:
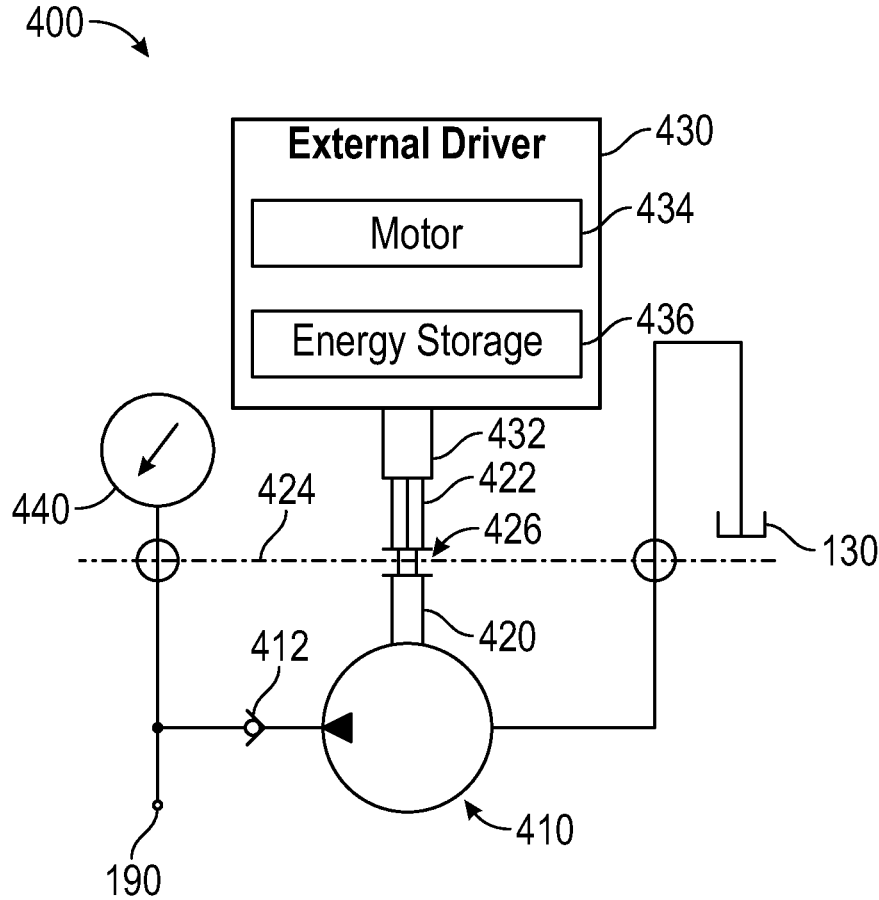

FIG. 9 is a schematic of a tow activation circuit of the vehicle of FIG. 1, according to an exemplary embodiment.

Figure 10:
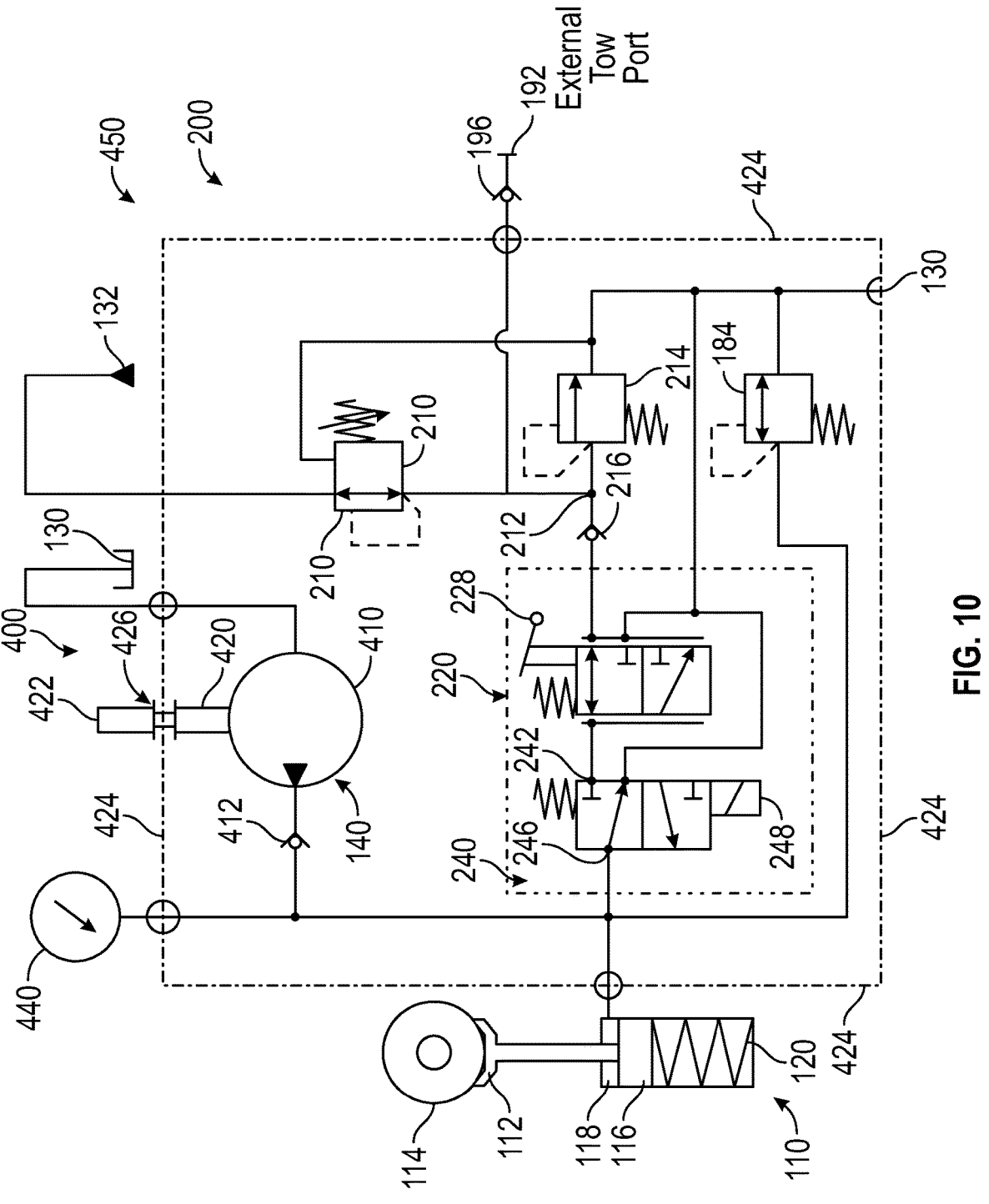

FIG. 10 is a schematic of the parking brake system of FIG. 5 and the tow activation circuit of FIG. 9.

Figure 11:
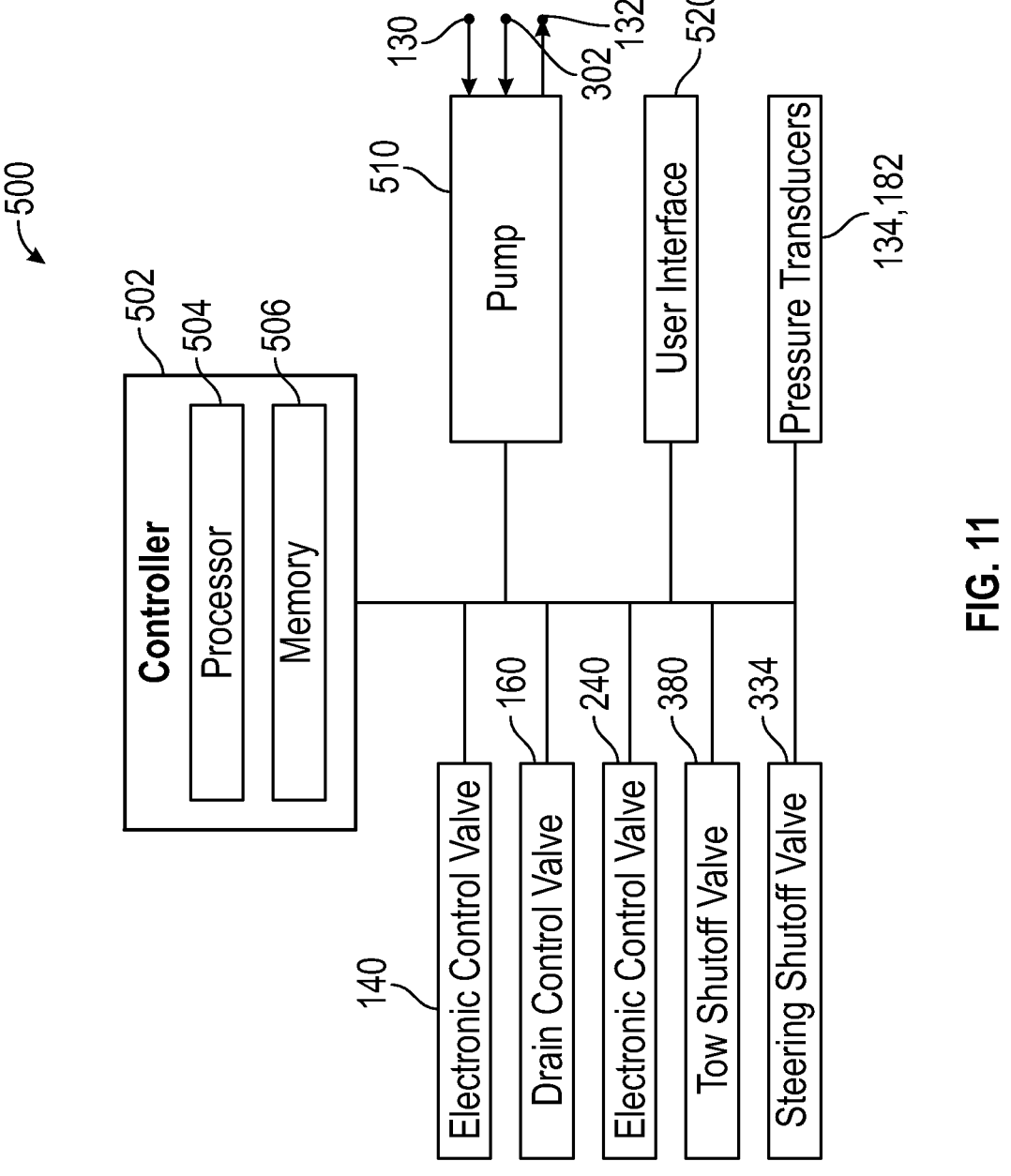

FIG. 11 is a block diagram of a control system of the vehicle of FIG. 1.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes an automatically-engaging parking brake system. When the vehicle is turned on and operating normally, a prime mover (e.g., an engine) drives a pump to provide pressurized fluid to hold a parking brake in a disengaged configuration. However, if the vehicle is turned off or malfunctions, the flow of fluid to the parking brake ends, and the parking brake automatically engages. This is advantageous, as this automatic activation ensures the vehicle remains stationary when parked and/or slows to a stop automatically during a failure of a component. However, when the vehicle is towed (e.g., onto a trailer) while the prime mover is non-operational, the parking brake must be disengaged without the use of the pump connected to the prime mover.

In other systems, this is accomplished by attaching a manually-operated hand pump to the vehicle and manually pumping fluid into the parking brake. This process is time-consuming and cumbersome, as a user may sometimes be required to perform one hundred or more pumps to fully disengage the parking brake. Additionally, if there is leakage within the system, an operator may not be able to pump quickly enough to overcome the leakage and achieve the desired pressure.

To more easily disengage the parking brake, the vehicle of the present disclosure includes an onboard pump that supplies fluid to disengage the parking brake. In some configurations, this pump is a steering pump that is driven by a steering wheel of the vehicle. In other configurations, this pump is driven by an input shaft that extends outside of the vehicle. An external driver, such as a cordless drill, may be selectively engaged with the input shaft to drive the pump and disengage the parking brake.

Overall Vehicle

Figure 2:
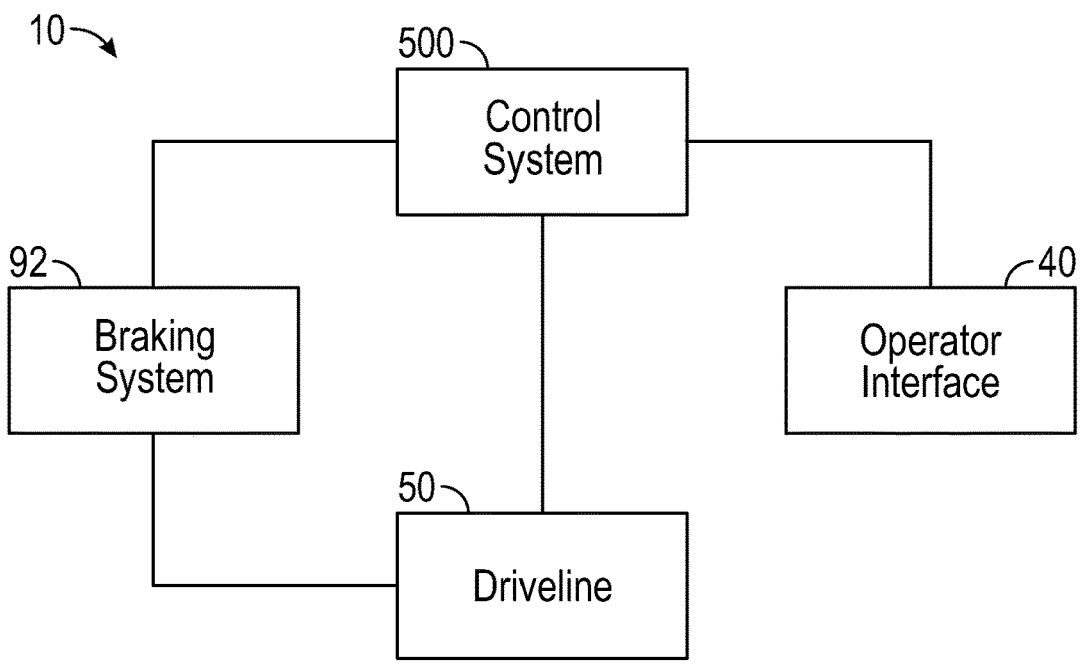
FIG. 2 is a schematic block diagram of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a vehicle control system, shown as control system 500, coupled to the operator interface 40, the driveline 50, and the braking system 92. In other embodiments, the vehicle 10 includes more or fewer components.

The chassis of the vehicle 10 may include a structural frame (e.g., the frame 12) formed from one or more frame members coupled to one another (e.g., as a weldment). Additionally or alternatively, the chassis may include a portion of the driveline 50. By way of example, a component of the driveline 50 (e.g., the transmission 52) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 92 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

Parking Brake System

Referring to FIG. 4, the braking system 92 include a hydraulic parking brake subsystem, shown as parking brake system 100. The parking brake system 100 may be part of a larger hydraulic system of the vehicle 10. The parking brake system 100 includes a parking brake assembly, shown as parking brake 110. The parking brake 110 is configured to apply a braking force on one or both of the front axle 76 and the rear axle 86 to slow the vehicle 10 and/or hold the vehicle 10 stationary. An operator may apply the parking brake 110 when the vehicle 10 is parked and the operator intends for the vehicle 10 to remain stationary for an extended period of time. Additionally or alternatively, the parking brake system 100 may automatically apply the parking brake 110 when another component of the vehicle 10 (e.g., the prime mover 52, a pump, etc.) is not operating (e.g., is shut off, is malfunctioning, etc.). In some embodiments, the parking brake 110 is a spring-applied, hydraulic-released park brake.

The parking brake 110 includes a braking element, shown as brake pad 112, that engages a portion of an axle 114 (e.g., the front axle 76, the rear axle 86) to apply a braking force. Additionally or alternatively, the parking brake 110 may indirectly apply the braking force on the axle 114 by applying a braking force on another part of the driveline 50 that is coupled to the 114, such as the transmission 56. The brake pad 112 is coupled to a movable element, shown as piston 116, that is positioned within a chamber 118 of the parking brake 110. The piston 116 is biased in a first direction by a biasing element, shown as spring 120, that applies a biasing force on the piston 116. The first direction is oriented toward the axle 114, such that the biasing force of the spring 120 biases the brake pad 112 into engagement with the axle 114. The piston 116 is biased in an opposing second direction by the pressure of a fluid (e.g., hydraulic oil) within the chamber 118. When no pressure is applied, the spring 120 biases the brake pad 112 into engagement (i.e., the parking brake 110 is normally engaged). When fluid is supplied to the chamber 118 at greater than a threshold pressure (e.g., 1.4 bar), the parking brake 110 is disengaged, and the vehicle 10 can move freely. The vehicle 10 may include one parking brake 110 or multiple parking brakes 110 that operate simultaneously (e.g., two parking brakes 110 on the same axle 114, one parking brake 110 on the front axle 76 and one parking brake on the rear axle 86, etc.).

The parking brake system 100 includes a low-pressure return or reservoir, shown as tank 130. The tank 130 may contain fluid at the lowest pressure within the hydraulic system of the vehicle 10 (e.g., atmospheric pressure). The tank 104 may receive fluid from the parking brake system 100 and/or supply fluid at a low pressure.

The parking brake system 100 includes a first input or fluid inlet or fluid supply, shown as pressure supply 132. The pressure supply 132 supplies pressurized fluid to the parking brake system 100 at an elevated pressure. The pressure supply 132 may be fluidly coupled to another component of the vehicle 10 (e.g., a pump coupled to the prime mover 52). In some embodiments, the delivery of the fluid to the pressure supply 132 is based on operation of another component of the vehicle 10. By way of example, the pressure supply 132 may be fluidly coupled to a pump that is coupled to the prime mover 52. During normal operation of the prime mover 52 (e.g., while the prime mover 52 is rotating), the pump supplies fluid to the pressure supply 132. However, when the prime mover 52 is not operating (e.g., because the prime mover 52 is turned off, because the prime mover 52 is malfunctioning, etc.), the fluid is not supplied to the pressure supply 132.

A first pressure sensor, shown as pressure transducer 134, is fluidly coupled to the pressure supply 132. The pressure transducer 134 measures the pressure of the fluid at the pressure supply 132. The pressure transducer 134 provides an electronic signal indicating the measured pressure.

The parking brake system 100 further includes a first directional control valve, shown as electronic control valve 140. The electronic control valve 140 is a solenoid-operated proportional directional control valve. The electronic control valve 140 has a first port, shown as inlet port 142, that is fluidly coupled to the pressure supply 132. The electronic control valve 140 has a second port or tank port, shown as drain port 144, that is fluidly coupled to the tank 130. The electronic control valve 140 has a third port, shown as outlet port 146.

The electronic control valve 140 is repositionable between a pair of positions. In a drain position or configuration (i.e., the lower position shown in FIG. 4), the inlet port 142 is plugged, and the outlet port 146 is fluidly coupled to the drain port 144. In a connected position or configuration (i.e., the upper position shown in FIG. 4), the drain port 144 is plugged, and the outlet port 146 is fluidly coupled to the inlet port 142.

The electronic control valve 140 includes an electric actuator, shown as solenoid 148, coupled to the spool. When activated, the solenoid 148 forces the spool of the electronic control valve 140 toward the connected position. The electronic control valve 140 includes a biasing element, shown as spring 150, that biases the electronic control valve 140 to the drain position. When the electronic control valve 140 is not pressurized and the solenoid 148 is deactivated, the spring 150 moves the electronic control valve 140 to the drain position (i.e., the electronic control valve 140 is normally in the drain position). The spool is biased toward the drain position by the pressure of the fluid at the outlet port 146. The spool is biased toward the connected position by the fluid at the drain port 144.

The parking brake system 100 further includes a second directional control valve, shown as drain control valve 160. The drain control valve 160 is a solenoid-operated directional control valve. The drain control valve 160 is fluidly coupled to the outlet port 146.

A spool of the drain control valve 160 includes a check valve 162.

The drain control valve 160 is reconfigurable between a pair of positions. In an open position or configuration, the drain control valve 160 permits free flow of fluid to and from the outlet port 146. In a closed position or configuration, the drain control valve 160 fluidly couples the outlet port 146 to the check valve 162. The check valve 162 permits flow from the outlet port 146 through the drain control valve 160, but prevents flow through the drain control valve 160 to the outlet port 146.

The drain control valve 160 includes an electric actuator, shown as solenoid 164, coupled to the spool. When activated, the solenoid 164 forces the spool of the drain control valve 160 toward the open position. The drain control valve 160 includes a biasing element, shown as spring 166, that biases the drain control valve 160 to the closed position. When the drain control valve 160 is not pressurized and the solenoid 164 is deactivated, the spring 166 moves the drain control valve 160 to the closed position (i.e., the drain control valve 160 is normally closed).

The parking brake system 100 further includes a third directional control valve, shown as manual control valve 170. The manual control valve 170 is a manually-operated proportional directional control valve. The manual control valve 170 has a first port, shown as inlet port 172, that is fluidly coupled to the drain control valve 160. The manual control valve 170 has a second port or tank port, shown as drain port 174, that is fluidly coupled to the tank 130. The manual control valve 170 has a third port, shown as outlet port 176, that is fluidly coupled to the chamber 118 of the parking brake 110.

The manual control valve 170 is repositionable between three positions or configurations. In a drain position or configuration (i.e., the lowermost position shown in FIG. 4), the inlet port 172 is plugged, and the outlet port 176 is fluidly coupled to the drain port 174. In a neutral position or configuration (i.e., the middle position shown in FIG. 4), the inlet port 172, the drain port 174, and the outlet port 176 are all plugged. In a connected position or configuration (i.e., the uppermost position shown in FIG. 4), the drain port 174 is plugged, and the outlet port 176 is fluidly coupled to the inlet port 172.

The manual control valve 170 includes a manual actuator or user interface, shown as lever 178, coupled to the spool. An operator may use the lever 178 to manually control the position of the spool. The manual control valve 170 includes a biasing element, shown as spring 180, that biases the manual control valve 170 toward the connected position. When the manual control valve 170 is not pressurized and the lever 178 is not operated by a user, the spring 180 moves the manual control valve 170 to the connected position (i.e., the manual control valve 170 is normally in the connected position). The spool is biased toward the drain position by the pressure of the fluid at the outlet port 176.

A second pressure sensor, shown as pressure transducer 182, is fluidly coupled to the outlet port 176. The pressure transducer 182 measures the pressure of the fluid at the outlet port 176. The pressure transducer 182 provides an electronic signal indicating the measured pressure.

A valve, shown as relief valve 184, is fluidly coupled to the outlet port 176 and the tank 130. If the pressure at the outlet port 176 exceeds a threshold pressure (e.g., a relief pressure, 30 bar, etc.), the relief valve 184 fluidly couples the outlet port 176 to the tank 130. Accordingly, the relief valve 184 limits the pressure at the outlet port 176 to at or below the relief pressure.

The parking brake system 100 includes a second input or fluid inlet, shown as tow input node 190, that is fluidly coupled to the chamber 118 and the outlet port 176. The tow input node 190 is fluidly coupled to another part of the hydraulic system of the vehicle 10. The tow input node 190 receives a pressurized fluid input (i.e., a tow activation input) from the other part of the hydraulic system. When the tow input node 190 receives the tow activation input, the tow input node 190 provides pressurized fluid to the chamber 118 to deactivate the parking brake 110.

The parking brake system 100 includes a third input or fluid inlet, shown as external tow port 192. The external tow port 192 may be positioned along an exterior surface of the vehicle 10, such that the external tow port 192 is accessible by a user positioned outside of the vehicle 10 or within the cab 30. The external tow port 192 may include a connector (e.g., a quick disconnect connector) that can be selectively coupled to an external source of fluid, shown as external fluid source 194. By way of example, the external fluid source 194 may include a manually-operated pump (e.g., a lever-operated piston pump) and/or an electrically-operated pump. The external fluid source 194 may not be present during normal operation of the vehicle 10. Instead, the external fluid source 194 may be connected only when a user intends to tow the vehicle 10. A check valve 196 is positioned between the external tow port 192 and the chamber 118. The check valve 196 prevents fluid from exiting the parking brake system 100 through the external tow port 192.

During normal operation of the vehicle 10, pressurized fluid is supplied to the pressure supply 132 (e.g., due to operation of the prime mover 52). The solenoid 148 is activated to move the electronic control valve 140 to the connected position, and the solenoid 164 is activated to move the drain control valve 160 to the open position. The manual control valve 170 is normally in the connected position. In such a configuration, the pressure supply 132 is fluidly coupled to the chamber 118 through the electronic control valve 140, the drain control valve 160, and the manual control valve 170, and the parking brake 110 is deactivated. If an operator wishes to activate the parking brake 110, the operator may deactivate the solenoid 148, such that the electronic control valve 140 fluidly couples the chamber 118 to the tank 130, draining the chamber 118 and activating the parking brake 110. Alternatively, the operator may engage the lever 178 to move the manual control valve 170 to the drain position, such that the manual control valve 170 fluidly couples the chamber 118 to the tank 130, draining the chamber 118 and activating the parking brake 110.

During a non-operational condition of the vehicle 10 (e.g., the prime mover 52 is switched off, the prime mover 52 is malfunctioning, etc.), the pressure supply 132 no longer supplies pressurized fluid. Accordingly, the chamber 118 is not pressurized, and the parking brake 110 is automatically activated. This may automatically slow the vehicle 10 and hold the vehicle 10 stationary in the event of a malfunction or when the vehicle 10 is shut off.

If an operator wishes to tow the vehicle 10 during a non-operational condition, it is desirable to deactivate the parking brake 110 to prevent wear of the brake pad 112 and/or damage to the parking brake 110. To deactivate the parking brake 110, the drain control valve 160 is switched to the closed position, and the manual control valve 170 is switched to the connected position. The spring 166 and the spring 180 may automatically bias the valves to these positions. The check valve 162 permits the buildup of pressure in the chamber 118 without the fluid draining to the tank 130.

An operator may supply pressurized fluid by fluidly coupling the external fluid source 194 to the external tow port 192. The user may operate the external fluid source 194 (e.g., by manually actuating a manual pump, etc.), such that fluid is supplied to the external tow port 192. The fluid passes through the check valve 196 and into the chamber 118, deactivating the parking brake 110. Alternatively, the operator may control the hydraulic system to supply fluid at the tow input node 190. The fluid may enter the chamber 118 and deactivate the parking brake 110.

Parking Brake System—Alternative Arrangement

Referring to FIG. 5, an alternative arrangement of the parking brake system 100 is shown as parking brake system 200 according to an exemplary embodiment. The parking brake system 200 may be substantially similar to the parking brake system 100 except as otherwise specified herein. Accordingly, any description of the parking brake system 100 may apply to the parking brake system 200 and vice versa.

The parking brake system 200 includes a first valve, shown as pressure reducing valve 210, that is fluidly coupled to the pressure supply 132. The pressure reducing valve 210 opens or closes based on a pressure downstream of the pressure reducing valve 210. The pressure reducing valve 210 reduces the pressure of the fluid supplied by the pressure supply 132 to at or below a threshold pressure (e.g., a reduced pressure, 26 bar, etc.). The pressure reducing valve 210 delivers the fluid at the reduced pressure to a point within the parking brake system 200 shown as node 212. The node 212 is fluidly coupled to the check valve 196.

The parking brake system 200 further includes second valve, shown as relief valve 214, that is fluidly coupled to the node 212 and the tank 130. If the pressure at the node 212 exceeds a threshold pressure (e.g., a relief pressure, 29 bar, etc.), the relief valve 214 fluidly couples the node 212 to the tank 130. Accordingly, the relief valve 214 limits the pressure at the node 212 to at or below the relief pressure.

A check valve, shown as drain control valve 216, is fluidly coupled to the node 212. The drain control valve 216 permits fluid to flow from the node 212 through the drain control valve 216. The drain control valve 216 prevents fluid from passing through the drain control valve 216 to the node 212.

The parking brake system 200 further includes a first directional control valve, shown as manual control valve 220. The manual control valve 220 is a manually-operated proportional directional control valve. The manual control valve 220 has a first port, shown as inlet port 222, that is fluidly coupled to the drain control valve 216. The manual control valve 220 has a second port or tank port, shown as drain port 224, that is fluidly coupled to the tank 130. The manual control valve 220 has a third port, shown as outlet port 226, that is fluidly coupled to the chamber 118 of the parking brake 110.

The manual control valve 220 is repositionable between a pair of positions or configurations. In a drain position or configuration (i.e., the lowermost position shown in FIG. 5), the inlet port 222 is plugged, and the outlet port 226 is fluidly coupled to the drain port 224. In a connected position or configuration (i.e., the uppermost position shown in FIG. 5), the drain port 224 is plugged, and the outlet port 226 is fluidly coupled to the inlet port 222.

The manual control valve 220 includes a manual actuator or user interface, shown as lever 228, coupled to a spool of the manual control valve 220. An operator may use the lever 228 to manually control the position of the spool. The manual control valve 220 includes a biasing element, shown as spring 230, that biases the manual control valve 220 toward the connected position. When the lever 228 is not operated by a user, the spring 230 moves the manual control valve 220 to the connected position (i.e., the manual control valve 220 is normally in the connected position).

The parking brake system 200 further includes a second directional control valve, shown as electronic control valve 240. The electronic control valve 240 is a solenoid-operated directional control valve. The electronic control valve 240 has a first port, shown as inlet port 242, that is fluidly coupled to the outlet port 226. The electronic control valve 240 has a second port or tank port, shown as drain port 244, that is fluidly coupled to the tank 130. The electronic control valve 240 has a third port, shown as outlet port 246, that is fluidly coupled to the chamber 118, the tow input node 190, and the relief valve 184.

The electronic control valve 240 is repositionable between a pair of positions. In a drain position or configuration (i.e., the upper position shown in FIG. 5), the inlet port 242 is plugged, and the outlet port 246 is fluidly coupled to the drain port 244. In a connected position or configuration (i.e., the lower position shown in FIG. 5), the drain port 244 is plugged, and the outlet port 246 is fluidly coupled to the inlet port 242.

The electronic control valve 240 includes an electric actuator, shown as solenoid 248, coupled to the spool. When activated, the solenoid 248 forces the spool of the electronic control valve 240 toward the connected position. The electronic control valve 240 includes a biasing element, shown as spring 250, that biases the electronic control valve 240 toward the drain position. When the solenoid 248 is deactivated, the spring 250 moves the electronic control valve 240 to the drain position (i.e., the electronic control valve 240 is normally in the drain position).

During normal operation of the vehicle 10, pressurized fluid is supplied to the pressure supply 132 (e.g., due to operation of the prime mover 52). The solenoid 248 is activated to move the electronic control valve 240 to the connected position. The manual control valve 220 is normally in the connected position. In such a configuration, the pressure supply 132 is fluidly coupled to the chamber 118 through the pressure reducing valve 210, the drain control valve 216, the manual control valve 220, and the electronic control valve 240, and the parking brake 110 is deactivated. If an operator wishes to activate the parking brake 110, the operator may deactivate the solenoid 248, such that the electronic control valve 140 fluidly couples the chamber 118 to the tank 130, draining the chamber 118 and activating the parking brake 110. Alternatively, the operator may engage the lever 228 to move the manual control valve 220 to the drain position, such that the manual control valve 220 fluidly couples the chamber 118 to the tank 130, draining the chamber 118 and activating the parking brake 110.

If an operator wishes to tow the vehicle 10 during a non-operational condition, an operator may deactivate the parking brake 110. To deactivate the parking brake 110, the solenoid 248 is activated to switch the electronic control valve 240 to the connected position, and the manual control valve 220 is switched to the connected position. The spring 230 may automatically bias the manual control valve 220 to the connected position. The drain control valve 260 permits the buildup of pressure in the chamber 118 without the fluid draining to the tank 130.

An operator may supply pressurized fluid by fluidly coupling the external fluid source 194 to the external tow port 192. The user may operate the external fluid source 194 (e.g., by manually actuating a manual pump, etc.), such that fluid is supplied to the external tow port 192. The fluid passes through the check valve 196 and into the chamber 118, deactivating the parking brake 110. Alternatively, the operator may control the hydraulic system to supply fluid at the tow input node 190. The fluid may enter the chamber 118 and deactivate the parking brake 110.

Tow Activation Input—Steering Pump

Referring to FIGS. 6 and 7, the vehicle 10 includes a hydraulic steering system, shown as steering system 300. The steering system 300 is configured to control steering of the front tractive elements 78 and/or the rear tractive elements 88 to steer of the vehicle 10. Additionally, the steering system 300 is fluidly coupled to the tow input node 190 and configured to provide the tow activation input to deactivate the parking brake 110 and facilitate towing the vehicle 10.

Although the steering system 300 is a continuous system, the steering system 300 is split across FIGS. 6 and 7 for ease of illustration. The portion of the steering system 300 shown in FIG. 6 and the portion of the steering system 300 shown in FIG. 7 are connected at three locations, points, or nodes within the steering system 300: a first point, shown as left turn node L, a second point, shown as right turn node R, and a third point, shown as load sense node LS. The left turn node L provides pressurized fluid to facilitate turning the vehicle 10 to the left. The right turn node R provides pressurized fluid to facilitate turning the vehicle 10 to the right. The load sense node LS provides pressure feedback from within the portion of the steering system 300 shown in FIG. 6. This pressure feedback may be used to control a load sense feature of a pump. The portion of the steering system 300 shown in FIG. 7 receives the pressure feedback, further modifies the pressure feedback, and provides the modified pressure feedback at an outlet, shown as load sense port 302, that is fluidly coupled to another portion of the vehicle 10 (e.g., a pump).

The steering system 300 includes an input or fluid inlet, shown as pressure supply 304. The pressure supply 304 supplies pressurized fluid to the steering system 300. In some embodiments, the pressure supply 304 and the pressure supply 132 are provided with pressurized fluid from the same source. In other embodiments, the pressure supply 304 and the pressure supply 132 are provided with fluid from different sources.

The steering system 300 includes a rotatable user interface, shown as steering wheel 310. The steering wheel 310 is positioned to be engaged by an operator of the vehicle 10 (e.g., by the operator's hands, etc.). By way of example, the steering wheel 310 may be positioned within the cab 30. The operator may rotate the steering wheel 310 to control steering of the vehicle 10. By way of example, rotating the steering wheel 310 clockwise may cause the vehicle 10 to steer to the right. By way of another example, rotating the steering wheel 310 counterclockwise may cause the vehicle to steer to the left. The steering wheel 310 may have various shapes. By way of example, the steering wheel 310 may or may not have a continuous circular outer surface.

The steering system 300 further includes a hydraulic cylinder or linear actuator, shown as steering actuator 320. The steering actuator 320 is coupled to a pair of tractive elements 322 (e.g., the front tractive elements 78, the rear tractive elements 88, etc.). Specifically, the steering actuator 320 includes a movable element, shown as rod 324, that slides relative to a housing 326. The housing 326 is coupled to the frame 12, and each end of the rod 324 is coupled to one of the tractive elements 322. Accordingly, as the rod 324 moves relative to the housing 326, the tractive elements 322 are moved to the left or the right to control the current steering angle of the vehicle 10. In other embodiments, the steering actuator 320 is used to control the steering of a vehicle 10 or other machine having an articulated frame. In such an embodiment, the frame 12 may include a front portion pivotally coupled to a back portion, such that a frame angle between the front portion and the rear portion can be adjusted to control the steering of the vehicle 10. The steering actuator 320 may be coupled to the front portion and the rear portion of the frame 12 such that movement of the rod 324 relative to the housing 326 adjusts the frame angle relative to the centerline of the vehicle 10 to steer the vehicle 10.

The rod 324 includes a piston that is received within an inner volume of the housing 326. A first chamber, shown as right turn chamber 330, is defined between the housing 326 and a first side of the piston. A second chamber, shown as left turn chamber 332, is defined between the housing 326 and a second side of the piston. When fluid is added to the right turn chamber 330, the rod 324 moves to the right and causes the tractive elements 322 to steer to the right. When fluid is added to the left turn chamber 332, the rod 324 moves to the left and causes the tractive elements 322 to steer to the left. The steering wheel 310 controls the flow of fluid to the right turn chamber 330 and the left turn chamber 332 to control the steering of the vehicle 10.

The steering system 300 includes a directional control valve, shown as steering shutoff valve 334. The steering shutoff valve 334 is repositionable between an open position (i.e., the right position shown in FIG. 7) and a closed position (i.e., the left position shown in FIG. 7). In the open position, the steering shutoff valve 334 fluidly couples the right turn node R to the right turn chamber 330 and fluidly couples the left turn node L to the left turn chamber 332. In the closed position, the steering shutoff valve 334 fluidly decouples the right turn node R and the left turn node L from the steering actuator 320. The steering shutoff valve 334 is normally biased into the open position by a spring, as well as by the pressure at the load sense node LS. The steering shutoff valve 334 can be moved to the closed position by another source of pressurized fluid within the steering system 300 (e.g., as controlled by the controller 502).

The steering system 300 includes additional components 336 (e.g., valves, orifices, connections, electric actuators, sensors, etc.) shown in FIGS. 6 and 7. These components 336 may facilitate steering the vehicle 10 and/or control over the steering. By way of example, the components 336 may facilitate control over the steering actuator 320 when the steering shutoff valve 334 is closed. By way of another example, the components 336 may facilitate providing makeup fluid from the tank 130 to another portion of the steering system 300 to prevent the fluid within the steering system 300 from experiencing a negative pressure.

The steering system 300 includes an onboard pump, shown as steering pump 340. The steering pump 340 includes a first inlet/outlet port, shown as port 342, and a second inlet/outlet port, shown as port 344. The steering pump 340 is coupled to the steering wheel 310 such that rotation of the steering wheel 310 drives an input shaft of the steering pump 340 to power operation of the steering pump 340. When the steering wheel 310 is rotated clockwise, steering pump 340 draws fluid in at the port 342 and expels the fluid at an elevated pressure at the port 344. When the steering wheel 310 is rotated counterclockwise, the steering pump 340 draws fluid in at the port 344 and expels the fluid at an elevated pressure at the port 342.

The steering system 300 further includes a directional control valve, shown as steering control valve 350, that controls operation of the steering system 300 based on the position of the steering wheel 310. The steering control valve 350 is a manually-actuated, proportional, three-position directional control valve. The steering control valve 350 includes a first port, shown as supply port 352, that is fluidly coupled the pressure supply 304 through a check valve. A second port, shown as pump port 354, is fluidly coupled to the port 342 of the steering pump 340. A third port, shown as pump port 356, is fluidly coupled to the port 344 of the steering pump 340. A fourth port, shown as load sense port 358, is fluidly coupled to the load sense node LS. A fifth port, shown as tank port 360, is fluidly coupled to the tank 130. A fifth port, shown as left turn port 362, is fluidly coupled to the left turn node L. A sixth port, shown a right turn port 364, is fluidly coupled to the right turn node R.

The steering control valve 350 is repositionable between three positions or configurations. The steering control valve 350 is biased into a first position or neutral position (i.e., the center position shown in FIG. 6) by a pair of springs. In the neutral position, the supply port 352 is plugged. The load sense port 358 is fluidly coupled to the tank port 360, draining the load sense node LS to the tank 130. The pump port 354 is fluidly coupled to the left turn port 362, and the pump port 356 is fluidly coupled to the right turn port 364. Accordingly, if the steering wheel 310 is not moved such that the steering pump 340 is inactive, no fluid is added or removed from the left turn node R or the right turn node R, and the steering actuator 320 is stationary. If the steering wheel 310 is moved while in the neutral position, fluid can be freely exchanged between the left turn node L and the right turn node R to move the steering actuator 320. By way of example, if the steering wheel 310 is turned to the right, the fluid is drawn from the left turn chamber 332, through the left turn port 362, through the pump port 354, and into the steering pump 340 and expelled through the pump port 356, through the right turn port 364, and into the right turn chamber 330.

In a second position or left turn position (i.e., the left position shown in FIG. 6), the supply port 352 is fluidly coupled to the pump port 356 and the load sense port 358. The right turn port 364 is fluidly coupled to the tank port 360. The pump port 354 is fluidly coupled to the left turn port 362. In operation, fluid from the pressure supply 304 passes through the supply port 352 and the pump port 356 and enters the steering pump 340. If the steering pump 340 is being turned by the steering wheel 310, the steering pump 340 further increases the pressure of the fluid. The fluid exits the steering pump 340 and passes through the pump port 354 and the left turn port 362 and into the left turn chamber 332. This fluid forces the steering actuator 320 to turn left and forces fluid out of the right turn chamber 330. This displaced fluid may pass freely through the right turn port 364 and the tank port 360 to the tank 130. Accordingly, the left turn position is associated with steering the vehicle 10 to the left.

In a third position or right turn position (i.e., the right position shown in FIG. 6), the supply port 352 is fluidly coupled to the pump port 354 and the load sense port 358. The left turn port 362 is fluidly coupled to the tank port 360. The pump port 356 is fluidly coupled to the right turn port 364. In operation, fluid from the pressure supply 304 passes through the supply port 352 and the pump port 354 and enters the steering pump 340. If the steering pump 340 is being turned by the steering wheel 310, the steering pump 340 further increases the pressure of the fluid. The fluid exits the steering pump 340 and passes through the pump port 356 and the right turn port 364 and into the right turn chamber 330. This fluid forces the steering actuator 320 to turn right and forces fluid out of the left turn chamber 332. This displaced fluid may pass freely through the left turn port 362 and the tank port 360 to the tank 130. Accordingly, the right turn position is associated with steering the vehicle 10 to the right.

The steering system 300 further includes a coupler assembly, shown as linkage 370, that couples the steering wheel 310 to the steering control valve 350. The linkage 370 ties movement of the steering wheel 310 to the steering control valve 350, such that movement of the steering wheel 310 causes a corresponding movement of the steering control valve 350. When the steering wheel 310 is moved clockwise, the linkage 370 moves the steering control valve 350 toward the right turn position. When the steering wheel 310 is moved counterclockwise, the linkage 370 moves the steering control valve 350 toward the left turn position.

The steering system 300 includes a series of valves that supply pressurized fluid to the tow input node 190 as a tow activation input. As shown, the valves supply pressurized fluid from the right turn node R to the tow input node 190. In other embodiments, the valves supply pressurized fluid from the left turn node L to the tow input node 190. In yet other embodiments, the valves supply pressurized fluid from both the left turn node L and the right turn node R to the tow input node 190.

The steering system 300 includes a directional control valve, shown as tow shutoff valve 380, that is configured to selectively fluidly couple the right turn node R to the tow input node 190. The tow shutoff valve 380 is repositionable between a closed position or configuration (i.e., the lower position shown in FIG. 6) and an open position or configuration (i.e., the upper position shown in FIG. 6). In the closed position, the tow shutoff valve 380 fluidly decouples the right turn node R from the tow input node 190. In the open position, the tow shutoff valve 380 fluidly couples the right turn node R to the tow input node 190. The tow shutoff valve 380 is biased toward the closed position by a spring 382. The tow shutoff valve 380 includes an electric actuator, shown as solenoid 384, that selectively repositions the tow shutoff valve 380. When the solenoid 384 is deactivated, the spring 382 returns the tow shutoff valve 380 to the closed position (i.e., the tow shutoff valve 380 is normally closed). When the solenoid 384 is activated, the biasing force of the spring 382 is overcome, and the tow shutoff valve 380 is moved to the open position.

The steering system 300 includes a pressure reducing valve 390 that is positioned between the tow shutoff valve 380 and the tow input node 190. The pressure reducing valve 390 opens or closes based on a pressure downstream of the pressure reducing valve 390 (e.g., the pressure at the tow input node 190). The pressure reducing valve 390 reduces the pressure of the fluid supplied to the tow input node 190 to at or below a desired threshold pressure (e.g., a reduced pressure, etc.). The pressure reducing valve 390 may ensure that the parking brake 110 receives fluid at a desired (e.g., rated) pressure.

The steering system 300 further includes a check valve 392 positioned between the pressure reducing valve 390 and the tow input node 190. The check valve 392 is oriented to permit fluid to flow from the pressure reducing valve 390 to the tow input node 190. The check valve 392 prevents fluid from flowing from the tow input node 190 back into the steering system 300. Accordingly, the check valve 392 prevents fluid from a parking brake system from entering the steering system 300.

To reconfigure the reconfigure the steering system 300 to supply fluid to the tow input node 190, an operator may activate the solenoid 384 to move the tow shutoff valve 380 to the open position. With the tow shutoff valve 380 in the open position, pressurized fluid from the right turn node R can flow through the tow shutoff valve to the tow input node 190. However, during a non-operational condition of the vehicle 10, the pressure supply 304 may be disabled, such that pressurized fluid is not supplied to the supply port 352.

In order to generate a flow of pressurized fluid, the operator may rotate the steering wheel 310 to operate the steering pump 340. By way of example, the operator may repeatedly rotate the steering wheel 310 between the clockwise and counterclockwise limits of the steering wheel 310. When turning the steering wheel 310, fluid is drawn into the steering pump 340 at one of the ports 342 and 344 and expelled at an elevated pressure at the other of the ports 342 and 344. At various points throughout the range of motion of the steering wheel 310, this pressurized fluid is supplied to the right turn port 364. The pressurized fluid flows from the right turn port 364 through the tow shutoff valve 380, the pressure reducing valve 390, and the check valve 392. The pressure reducing valve 390 reduces the pressure of the fluid, and the check valve 392 prevents the fluid from exiting the corresponding parking brake system. Once beyond the check valve 392, the fluid pressurizes the chamber 118 of a parking brake 110 to disengage the parking brake.

Once sufficient fluid has been supplied to disengage the parking brake 110, the operator may stop rotating the steering wheel 310, and the pressurized fluid is prevented from draining by the check valve 392. To prevent further pressurized fluid from reaching the tow input node 190, the operator may disengage the solenoid 384, returning the tow shutoff valve 380 to the closed position. With the tow shutoff valve 380 in the closed position, the operator may rotate the steering wheel 310 to move the steering actuator 320 and steer the vehicle 10 without additional fluid flowing to the tow input node 190.

FIG. 8 illustrates a steering system 300 as an alternative embodiment of the steering system 300. The steering system 300 of FIG. 8 may be substantially similar to the steering system 300 of FIGS. 6 and 7 except as otherwise specified herein. Accordingly, any description of the steering system 300 of FIG. 8 may apply to the steering system 300 of FIGS. 6 and 7 and vice versa. The steering system 300 of FIG. 8 includes two steering actuators 320. Each steering actuator 320 is coupled to one of the tractive elements 322. The right turn chambers 330 are fluidly coupled to one another, and the left turn chambers 332 are fluidly coupled to one another. In the steering system 300, the tow shutoff valve 380 includes a check valve. In the closed position of the tow shutoff valve 380, the check valve permits fluid to flow through the tow shutoff valve 380 toward the right turn node R but prevents fluid from flowing in the opposite direction.

Tow Activation Input—Onboard Pump with External Drive Shaft

Referring to FIG. 9, the vehicle includes a hydraulic circuit, shown as tow activation circuit 400. The tow activation circuit 400 is fluidly coupled to the tow input node 190 and configured to provide the tow activation input to deactivate the parking brake 110 and facilitate towing the vehicle 10. Although the tow activation circuit 400 is shown separately from the steering system 300 for ease of illustration, the vehicle 10 may include both the steering system 300 and the tow activation circuit 400. By way of example, the steering system 300 and the tow activation circuit 400 may both be fluidly coupled to the tow input node 190, and an operator may select either system for supplying the tow activation input based on the operator's preference.

The tow activation circuit 400 includes a pump, shown as tow pump 410, that is fixedly coupled to the frame 12. In some embodiments, the tow pump 410 is a gear pump, a gerotor pump, a vane pump, or another type of pump. In some embodiments, the tow pump 410 is a relatively small pump providing between 2 cc/revolution and 8 cc/revolution of fluid flow. The tow pump 410 may be fixedly coupled to the frame 12, such that the tow pump 410 is permanently installed on the vehicle 10. The tow pump 410 is fluidly coupled to the tank 130 and to the tow input node 190. A check valve 412 extends between the tow pump 410 and the tow input node 190. The check valve 412 permits fluid to pass from the tow pump 410 to the tow input node 190, but prevents fluid from passing from the tow input node 190 to the tow pump 410. When operated, the tow pump 410 receives fluid at a low pressure from the tank 130 and supplies the fluid at an elevated pressure to the tow input node 190 through the check valve 412.

The tow pump 410 is coupled to a drive shaft, shown as input shaft 420. The input shaft 420 is configured to receive a rotational mechanical energy input and transfer the rotational mechanical energy to the tow pump 410 to power the tow pump 410. The input shaft 420 includes an interface or hexagonal portion, shown as hex shaft 422, at an end of the input shaft 420. The hex shaft 422 may have a hexagonal cross section (e.g., is shaped as a hexagon when viewed perpendicular to the length of the hex shaft 422).

As shown, the vehicle 10 includes an exterior wall, shown as wall 424, along an exterior surface of the vehicle 10. In some embodiments, the wall 424 is a wall of the body 20. The tow pump 410 is entirely positioned on an interior side of the wall 424. Accordingly, the tow pump 410 is normally inaccessible to an operator positioned outside the vehicle 10 or within the cab 30 (e.g., is inaccessible without opening a door or disassembling the vehicle 10). The input shaft 420 extends from the interior side of the wall 424 to the exterior side of the wall 424 through an aperture 426 defined by the wall 424. The hex shaft 422 is positioned on an exterior side of the wall 424. The hex shaft 422 may be accessible by an operator positioned outside the vehicle or within the cab 30.

The tow pump 410 is configured to be driven by an external source of rotational mechanical energy, shown as external driver 430. The external driver 430 is configured to be selectively coupled to the input shaft 420 to provide rotational mechanical energy to the tow pump 410. As shown, the external driver 430 includes an interface, shown as socket 432, that is configured to selectively engage the hex shaft 422 to selectively rotationally couple the external driver 430 to the input shaft 420. The socket 432 may define a recess that is shaped to receive the hex shaft 422 while limiting (e.g., preventing) rotation of the hex shaft 422 relative to the socket 432. By way of example, the socket 432 may define a hexagonal recess that is sized to receive the hex shaft 422. The socket 432 may be slid axially onto the hex shaft 422, and the corresponding hexagonal shapes of the hex shaft 422 and the socket 432 may prevent rotation of the socket 432 relative to the hex shaft 422. The socket 432 may be removed by sliding the socket 432 axially away from the hex shaft 422.

In other embodiments, the tow activation circuit 400 utilizes a different interface between the external driver 430 and the input shaft 420. By way of example, the hex shaft 422 and the socket 432 may instead be square-shaped, triangular, D-shaped, or otherwise have a cross-sectional shape that limits relative rotation. By way of another example, the socket 432 may be replaced with another type of interface, such as an open-ended wrench or a clamp.

The external driver 430 is configured to provide a rotational mechanical energy input to the input shaft 420. In some embodiments, the external driver 430 includes an actuator (e.g., an electric motor, a pneumatic motor, etc.), shown as motor 434, that is configured to apply a torque on the socket 432. In some embodiments, the external driver 430 includes an onboard energy storage device, shown as energy storage 436, that supplies stored energy to power the motor 434. By way of example, the energy storage 436 may include a battery that supplies electrical energy to power the motor 434. By way of another example, the energy storage 436 may include a tank of compressed gas.

In one embodiment, the external driver 430 is a battery-operated cordless drill. In such an embodiment, the energy storage 436 is a battery, and the motor 434 is an electric motor coupled to the battery and configured to rotate in response to a user pressing a trigger of the drill. The socket 432 may be a standard-sized socket (e.g., ½", ⅜", etc.) that is compatible with a standard ratcheting wrench. The socket 432 may be selectively coupled to the motor 434 by a drill chuck.

In other embodiments, the external driver 430 is unpowered. Instead, the external driver 430 may be driven by a force applied by the operator. By way of example, the external driver 430 may be a wrench that can be selectively coupled to the hex shaft 422. Once coupled, the operator may turn the wrench to rotate the input shaft 420 and drive the tow pump 410.

The tow activation circuit 400 further includes a display or gauge, shown as pressure gauge 440, that is fluidly coupled to the tow input node 190. The pressure gauge 440 is configured to measure the pressure of the fluid at the tow input node 190 and indicate the measured pressure to an operator. In some embodiments, the pressure gauge 440 is a visual indicator (e.g., a dial gauge, a digital gauge, etc.) that indicates the measured pressure visually. In such embodiments, the pressure gauge 440 may be coupled to the wall 424 and positioned on an exterior side of the wall 424 such that the pressure gauge 440 is visible to a user positioned on the exterior side of the wall 424. In other embodiments, the pressure gauge 440 audibly indicates the measured pressure audibly (e.g., a tone that changes in pitch or length based on the measured pressure).

In some embodiments, the pressure gauge 440 indicates the difference between the measured pressure and a threshold pressure. The threshold pressure may be a pressure that is required to deactivate the parking brake 110. By way of example, if the pressure gauge 440 includes a dial indicator, the pressure gauge 440 may include a marking indicating the threshold pressure on the dial. By way of another example, the pressure gauge 440 may illuminate a warning light when the measured pressure exceeds the threshold pressure. By way of another example, the pressure gauge 440 may be silent when the measured pressure is below the threshold pressure and emit an audible tone when the measured pressure exceeds the threshold pressure.

During normal operation of the vehicle 10, the external driver 430 may be disconnected from the input shaft 420 and stored elsewhere on the vehicle 10 (e.g., in a toolbox coupled to the body 20). When an operator intends to configure the vehicle 10 for towing during a non-operational condition of the vehicle 10, the operator may retrieve the external driver 430 and engage the socket 432 with the hex shaft 422. The operator may operate the external driver 430 to provide a rotational mechanical energy input to the input shaft 420. This input causes the tow pump 410 to provide pressurized fluid through the check valve 412. This pressurized fluid increases the pressure at the tow input node 190 until the parking brake 110 is deactivated. The operator may refer to the pressure gauge 440 during this process to determine when the threshold pressure required to deactivate the parking brake 110 has been achieved. At this point, the operator may disconnect the external driver 430 from the input shaft 420 and begin towing the vehicle 10.

Referring to FIG. 10, the tow activation circuit 400 is configured for use with the parking brake system 200 of FIG. 5, according to an exemplary embodiment. In this embodiment, a housing 450 is formed from several of the walls 424. The housing 450 may be the body 20 of the vehicle 10. The walls 424 of the housing 450 define an internal volume containing several components of the steering system 300 and the parking brake system 200. By way of example, the housing 450 contains the relief valve 184, the pressure reducing valve 210, the relief valve 214, the drain control valve 216, the manual control valve 220, the electronic control valve 240, the tow pump 410, and the check valve 412. Accordingly, these components may not be accessible (e.g., may be obstructed by the walls 424) during normal operation of the vehicle 10.

Control System

Referring to FIG. 11, the control system 500 is shown according to an exemplary embodiment. The control system 500 includes a processing circuit, shown as controller 502, that controls operation of the vehicle 10 (e.g., the parking brake system 200, the steering system 300, the tow activation circuit 400, etc.). The controller 502 includes a processing device, shown as processor 504, and a memory device, shown as memory 506. The memory 506 may store one or more instructions that, when executed by the processor 504, cause the processor 504 to perform one or more of the processes described herein.

As shown, the controller 502 is operatively coupled to the electronic control valve 140, the drain control valve 160, the electronic control valve 240, the tow shutoff valve 380, and the steering shutoff valve 334. Specifically, the controller 502 is operatively coupled to the solenoid 148, the solenoid 164, the solenoid 248, the solenoid 384, and other solenoid valves that control the steering shutoff valve 334. The controller 502 may provide control signals (e.g., electrical signals, etc.) to the various solenoids to control operation of the various valves. By way of example, the controller 502 may provide an electrical signal to the solenoid 164 to reconfigure the drain control valve 160 between the open position and the closed position.

As shown, the controller 502 is operatively coupled to the pressure transducers 134 and 182. The controller 502 may receive the measured pressures sensed by the pressure transducers 134 and 182. The controller 502 may utilize the measured pressures when controlling the vehicle 10.

As shown in FIGS. 3 and 11, the controller 502 is operatively coupled to a pressure supply, shown as pump 510. The pump 510 may be driven by the prime mover 52 through the PTO 90. The controller 502 may control operation of the pump 510 (e.g., by varying a displacement of the pump 510, by varying a speed of the pump 510, etc.). The pump 510 may receive fluid at a low pressure from the tank 130 and supply pressurized fluid at the pressure supply 132.

The pump 510 may receive pressure feedback from the load sense port 302. In such embodiments, the pump 510 may be a load sense pump.

Referring still to FIG. 11, the control system 500 includes an input/output device, shown as user interface 520. The user interface 520 may facilitate communication between the controller 502 and a user or operator (e.g., by communicating information to the user, by receiving commands from the user, etc.). The user interface 520 may include one or more input devices (e.g., a touchscreen, buttons, switches, knobs, microphones, etc.) that receive inputs (e.g., commands) from a user. The user interface 520 may include one or more output devices (e.g., displays, speakers, haptic feedback vibrators, etc.) that provide information to the user.

In operation, the controller 502 may reconfigure the vehicle 10 between a normal operating configuration and a tow configuration. The controller 502 may reconfigure the vehicle 10 in response to an input through the user interface (e.g., a selection of a desired operating mode by a user). Additionally or alternatively, the controller 502 may automatically reconfigure the vehicle 10 in response to predetermined conditions (e.g., a sensor indicating that the prime mover 52 is not operating).

In the normal operating configuration, the pressure supply 132 supplies pressurized fluid to disengage the parking brake 110, and the parking brake 110 may be engaged when the pressure supply 132 stops supplying the pressurized fluid. In the normal operating configuration, the electronic control valve 140 is in the connected position, the drain control valve 160 is in the open position, the electronic control valve 240 is in the connected position, and the tow shutoff valve 380 is in the closed position. If an operator engages the parking brake 110 (e.g., to park the vehicle 10), the operator may issue commands through the user interface 520 for (a) the electronic control valve 140 to move to the drain position or (b) for the electronic control valve 240 to move to the drain position. Alternatively, the operator may manually reconfigure the manual control valve 170 or the manual control valve 220 to the drain position.

In the tow configuration, the pressure supply 132 the parking brake 110 may be disengaged by pressurized fluid from the tow input node 190. In the tow configuration, the drain control valve 160 is in the closed position, the electronic control valve 240 is in the connected position, and the tow shutoff valve 380 is in the open position.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 92, the control system 500, etc.) as shown in the various exemplary embodiments is illustrative only. Additionally, any element disclosed in one embodiment may be incorporated or utilized with any other embodiment disclosed herein.

What is claimed is:

1. A vehicle, comprising:
   a chassis comprising at least one of a transmission or a structural frame;
   a tractive element coupled to the chassis; and
   a parking brake system comprising:
      a parking brake configured to brake the tractive element when engaged, wherein the parking brake is configured to be disengaged to permit rotation of the tractive element in response to the parking brake receiving a fluid;
      a fluid supply configured to supply the fluid to the parking brake to disengage the parking brake, wherein the fluid supply is configured to stop supplying the fluid in response to a component of the vehicle ceasing operation, wherein the component of the vehicle is a prime mover configured to drive the tractive element to propel the vehicle; and
      a pump coupled to the chassis and configured to supply the fluid to the parking brake at least when the component of the vehicle is not operating,
      wherein the pump is a first pump, wherein the fluid supply is a second pump coupled to the prime mover and configured to be driven by the prime mover to supply the fluid to the parking brake; and an input shaft coupled to the first pump and configured to drive the first pump, wherein the input shaft includes an interface that is accessible from at least one of (a) an exterior of the vehicle or (b) within a cab of the vehicle.

2. The vehicle of claim 1, further comprising a valve reconfigurable between (a) a first configuration in which the valve fluidly couples the fluid supply to the parking brake and (b) a second configuration in which the valve fluidly couples the parking brake to a low-pressure return.

3. The vehicle of claim 2, wherein the valve is a first valve, further comprising a second valve reconfigurable between (a) a first configuration in which the second valve fluidly couples the first valve to the fluid supply and (b) a second configuration in which the second valve fluidly decouples the first valve from the fluid supply.

4. The vehicle of claim 3, wherein one of the first valve or the second valve is electrically actuated, and wherein the other of the first valve or the second valve is manually actuated.

5. The vehicle of claim 3, wherein the first pump is fluidly coupled to a point between the first valve and the parking brake such that the first pump is permitted to supply the fluid to the parking brake regardless of whether the first valve is in the first configuration or the second configuration.

6. The vehicle of claim 1, wherein the first pump is a steering pump, further comprising:

a steering actuator coupled to the tractive element and fluidly coupled to the steering pump; and a steering wheel coupled to the steering pump and configured to drive the steering pump, wherein, in response to rotation of the steering wheel, the steering pump is configured to (a) supply the fluid to the parking brake to disengage the parking brake and (b) supply the fluid to the steering actuator to steer the tractive element.

7. The vehicle of claim 6, further comprising a valve fluidly coupled to the steering pump and the parking brake and configured to selectively fluidly decouple the steering pump from the parking brake.

8. The vehicle of claim 7, further comprising an electric actuator configured to reconfigure the valve between an open configuration in which the valve fluidly couples the steering pump to the parking brake and a closed configuration in which the valve fluidly decouples the steering pump from the parking brake.

9. The vehicle of claim 7, further comprising a pressure reducing valve fluidly coupled to the valve and configured to reduce a pressure of the fluid passing from the steering pump to the parking brake.

10. The vehicle of claim 1, wherein the interface has a hexagonal cross section that is configured to selectively engage a socket.

11. The vehicle of claim 1, further comprising a gauge fluidly coupled to the parking brake and configured to provide an indication of a pressure of the fluid at the parking brake.

12. A vehicle, comprising:

a chassis comprising at least one of a transmission or a structural frame;

a tractive element coupled to the chassis; and a parking brake system comprising:

a parking brake configured to brake the tractive element when engaged, wherein the parking brake is configured to be disengaged to permit rotation of the tractive element in response to the parking brake receiving a fluid;

a fluid supply configured to supply the fluid to the parking brake to disengage the parking brake, wherein the fluid supply is configured to stop supplying the fluid in response to a component of the vehicle ceasing operation;

a pump coupled to the chassis and configured to supply the fluid to the parking brake at least when the component of the vehicle is not operating;

an external port configured to be coupled to an external source of the fluid;

a check valve fluidly coupled to the external port and oriented to prevent the fluid from flowing out of the parking brake system through the external port; and an input shaft coupled to the pump and configured to drive the pump, wherein the input shaft includes an interface that is accessible from at least one of (a) an exterior of the vehicle or (b) within a cab of the vehicle.

13. The vehicle of claim 1, wherein the first pump is a tow pump fluidly coupled to the parking brake, the vehicle further comprising:

a steering actuator coupled to the tractive element and fluidly coupled to a third pump, wherein the third pump is a steering pump;

a steering wheel coupled to the steering pump and configured to drive the steering pump to provide the fluid to the steering actuator and the parking brake, wherein the input shaft is a first input shaft coupled to the steering wheel and the steering pump, and wherein the interface is a first interface comprising the steering wheel;

the tow pump fluidly coupled to the parking brake; and a second input shaft coupled to the tow pump and configured to drive the tow pump, wherein the second input shaft includes a second interface that is accessible from the at least one of (a) the exterior of the vehicle or (b) within the cab of the vehicle, wherein the steering pump and the tow pump are each configured to supply the fluid to the parking brake to disengage the parking brake.

14. A vehicle comprising:

a chassis;

a tractive element coupled to the chassis;

a steering actuator coupled to the tractive element;

a parking brake configured to brake the tractive element when engaged;

a steering pump fluidly coupled to the steering actuator and the parking brake and configured to (a) supply a first volume of a fluid to the steering actuator to steer the tractive element and (b) supply a second volume of the fluid to the parking brake to disengage the parking brake; and a steering wheel coupled to the steering pump, wherein the steering wheel is configured to drive the steering pump when rotated.

15. The vehicle of claim 14, further comprising a steering control valve fluidly coupled to the steering actuator and the steering pump, wherein the steering actuator includes a first chamber and a second chamber, wherein the steering control valve is reconfigurable between (a) a right turn configuration in which the steering control valve directs the first volume of the fluid from the steering pump to the first chamber to steer the tractive element to the right and (b) a left turn configuration in which the steering control valve directs the second volume of the fluid from the steering pump to the second chamber to steer the tractive element to the left, and wherein the steering wheel is coupled to the steering control valve and configured to reconfigure the steering control valve between the left turn configuration and the right turn configuration.

16. A vehicle comprising:

a chassis;

a cab coupled to the chassis;

a tractive element coupled to the chassis;

a parking brake configured to brake the tractive element when engaged;

a pump fixedly coupled to the chassis and configured to supply a fluid to the parking brake to disengage the parking brake; and an input shaft coupled to the pump and configured to drive the pump, the input shaft being positioned such that the input shaft is accessible from at least one of (a) an exterior of the vehicle or (b) within the cab.

17. The vehicle of claim 16, wherein the input shaft includes an interface having a hexagonal cross section that is configured to selectively engage a socket of an external driver to receive a rotational mechanical energy input from the external driver.

* * * * *